United States Patent [19]
Cagle

[11] Patent Number: 5,814,218
[45] Date of Patent: Sep. 29, 1998

[54] DISTORTED RECTANGULAR FILTER CLOTH SCREEN FOR VIBRATING SCREENING MACHINE

[76] Inventor: William S. Cagle, 7021 E. 77th Pl., Tulsa, Okla. 74133

[21] Appl. No.: 585,624

[22] Filed: Jan. 16, 1996

[51] Int. Cl.[6] .......................... B01D 33/00; B01D 39/08; B01D 39/10; B07B 1/46
[52] U.S. Cl. .......................... 210/388; 210/389; 210/489; 210/490; 210/492; 210/499; 209/401; 209/403
[58] Field of Search .................... 210/388, 389, 210/499, 490, 492, 489; 209/401, 403

[56] References Cited

U.S. PATENT DOCUMENTS

| | | |
|---|---|---|
| 1,767,814 | 6/1930 | Reynolds . |
| 1,997,713 | 4/1935 | Boehm . |
| 2,723,032 | 11/1955 | Gisler . |
| 2,926,785 | 3/1960 | Sander . |
| 3,716,138 | 2/1973 | Lumsden . |
| 4,575,421 | 3/1986 | Derrick . |
| 4,696,751 | 9/1987 | Eifling . |
| 5,221,008 | 6/1993 | Derrick ............... 209/269 |
| 5,256,291 | 10/1993 | Cagle ................. 210/499 |
| 5,256,292 | 10/1993 | Cagle ................. 210/499 |
| 5,370,797 | 12/1994 | Cagle ................. 210/499 |
| 5,417,793 | 5/1995 | Derrick ............... 156/308.2 |
| 5,417,858 | 5/1995 | Derrick ............... 210/388 |
| 5,417,859 | 5/1995 | Derrick ............... 210/388 |

*Primary Examiner*—Thomas M. Lithgow
*Attorney, Agent, or Firm*—Frank J. Catalano; Scott R. Zingerman

[57] ABSTRACT

A screen for use with a vibrating screening machine to filter undesired particles from a liquid uses a filter cloth having a substantially rectangular mesh suitable for separating the undesired particles from the liquid bonded in laminar relationship to a back-up having a substantially coarser mesh. The substantially rectangular mesh is formed by a lengthwise array of parallel individual wires woven with a transverse widthwise array of parallel groups of at least three wires. The individual wires are distorted from rectangular proximate the ends of the rectangles by bows in the individual wires at their area of intersection with each of the parallel groups of wires. This configuration provides improved throughput and life characteristics over known screens. A plastic grid of mesh substantially greater than the back-up mesh may be fused to the bonded lamination of the filter cloth and the back-up. The fused grid, cloth and back-up may be corrugated in approximately triangular or sinusoidal fashion with the apexes and nadirs of corrugation being parallel to the groups of wires. The possibility of fracture and tearing at the apexes and nadirs of corrugation and the midpoint bubbling is reduced due to the distorted rectangular configuration. The screen in any of its embodiments can also be secured to a perforated plate or to a plurality of metal strips if additional strength is desired.

18 Claims, 3 Drawing Sheets

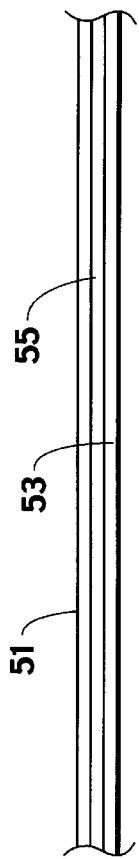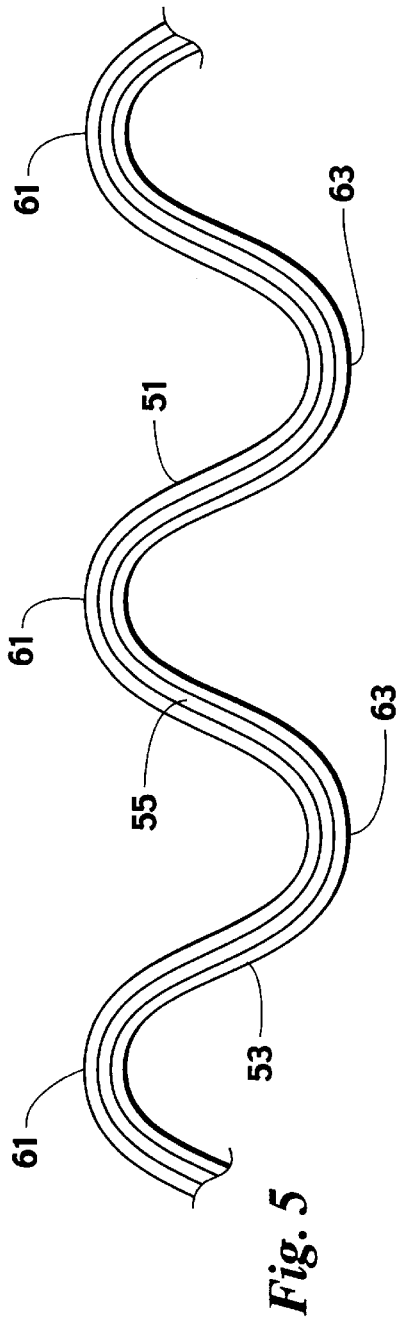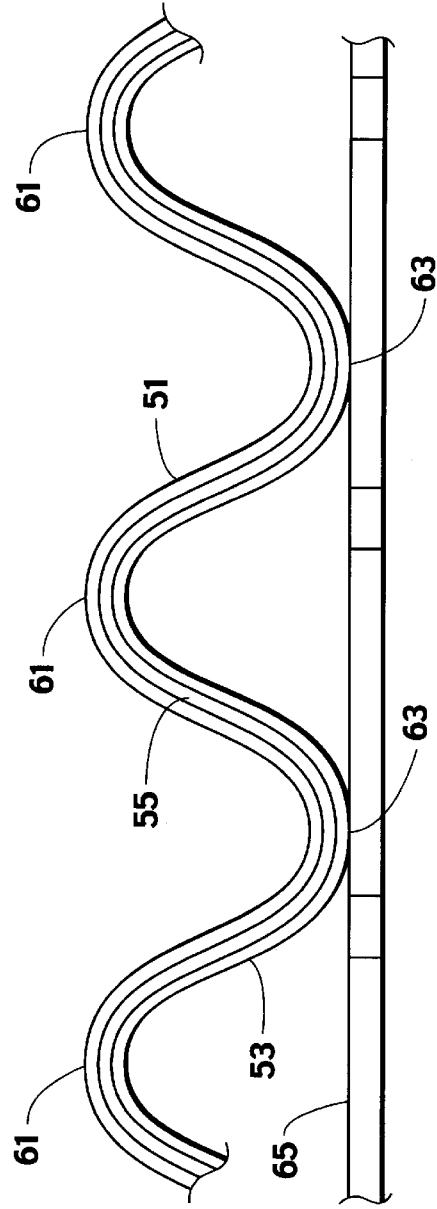

5,814,218

DISTORTED RECTANGULAR FILTER CLOTH SCREEN FOR VIBRATING SCREENING MACHINE

BACKGROUND OF THE INVENTION

This invention relates generally to screens for use with vibrating screen machines and more particularly concerns an improvement in screen structure resulting in increased life and throughput of such screens.

The development of vibrating screen technology leading up to the present invention can be appreciated by review of a few of the patents that have issued related to that technology in recent years, including U.S. Pat. No. 4,575,421 issued on Mar. 11, 1986, U.S. Pat. No. 5,221,008 issued on Jun. 22, 1993 and U.S. Pat. Nos. 5,417,793, 5,417,858 and 5,417,859 issued on May 23,1995, all assigned to Derrick Manufacturing Corporation, and U.S. Pat. Nos. 5,256,291 and 5,256,292 issued on Oct. 26, 1993 and U.S. Pat. No. 5,370,797 issued on Dec. 6, 1994 to the present inventor.

Prior to the '421 patent, most screens for vibrating machines consisted of one or more layered filter cloths spanning an open area, sometimes within a frame and, in some instances, on a perforated plate. The vibratory motion of the screen in the pressure head of the screened material caused the cloths to pulsate. As a result, in a very short time, the cloths would tear near their periphery or the uppermost cloth would be so seriously abraded by the filtered material as to render the screen useless. Faster pulsation and greater pressure heads, desirable conditions in order to increase the throughput of the screen, resulted in greater amplitudes of pulsation which, in turn, accelerated the destruction of the screen.

To increase screen life, the '421 patent layered a pair of filter cloths over a supporting screen or back-up of heavier gauge wire and considerably more open mesh and a plate having apertures considerably larger than the mesh of the back-up. The cloths, the back-up and the plate were secured together by adhesive applied at the perimeter of the plate so that the abutting filter cloths could still move laterally and vertically with respect to each other in order to prevent clogging. By reducing the size of the opening spanned by the filter cloths, the amplitude of pulsation was reduced, increasing the life of the screen. However, tearing along the mesh perimeters, though taking longer than tearing along the frame perimeter, still occurred. Furthermore, abrading of the finer outer filter cloth remained a serious problem. Given these deficiencies, as is pointed out in the '008 patent, screens of the '421 type still failed after only 5 hours of use.

The '008 patent sought to increase screen life beyond that of '421 screens by further reducing pulsation amplitude and by addressing the abrading of the uppermost fine cloth of the screen in a different fashion. To accomplish this, a third filter cloth of mesh not as fine as that of the finest cloth was layered as the uppermost cloth. This heavier cloth protected the finer cloth from abrading and also reduced the amplitude of pulsation. The '008 patent indicates that the resulting screen was found to last about 30 hours. Moreover, by applying a drop of epoxy to the screen at the center of each plate aperture, the filter cloths can be bonded together as well as to the back-up to stabilize the layers against flexing and further reduce pulsation amplitude and border tearing. However, this inhibits relative lateral and vertical motion of the cloths and reduces open screen area, thus reducing the screen throughput and increasing the possibility of clogging.

The basic approach of the '421 and '008 patents was the use of additional filter cloths and back-ups to overcome inherent cloth deficiencies. Unfortunately, those solutions also result in increased screen cost and lower screen throughput with each added layer. While increased screen life is a desired result, increased screen throughput and reduced screen cost are very important. Subsequent to those patents and in a totally different approach to the problem, the '291, '292 and '797 patents address the life and throughput characteristics of the individual filter cloths. The structural arrangements of shute and warp wires or filaments disclosed in those patents provide greater screen life and product throughput as characteristics of the filter cloth, thus enhancing any known screen structure in which they might be incorporated.

Thereafter, the '793, '858 and '859 patents again addressed the problem by modifying the screen structure to an undulating configuration. '858 type screens employ at least one and preferably two filter cloths and a back-up bonded to each other at every intersection by adhesive such as epoxy and then triangularly or sinusoidally corrugated to form parallel apexes and nadirs with connecting walls therebetween, the corrugated assembly being adhered to an apertured plate along its nadirs. '793 and '859 type screens bond the filter cloths and the back-up to each other by use of heat and pressure applied to a fused plastic grid layered with them to permeate all the filter cloths and the back-up. The resulting assembly is then corrugated and may also be applied to an apertured grid as was the '858 type of screen. These types of screens are said to increase throughput by increasing screen surface area. They are said to reduce damage to the screen caused by pulsation and abrading of the uppermost filter cloth because impinging particles are generally not striking the screen in a path normal to its surface. They are said to still permit the filter cloths to yield relative to each other so as to obviate blinding. However, these types of screens also introduce new problems because the stress in the filter cloths resulting from the bends at the apexes and nadirs of the corrugation increases the occurrence of fracture or tearing at these points, thus reducing screen life. In addition, in screens of this type, the cloth tends to bubble at approximately the midpoint between the apexes and the nadirs, shortening the life of the screen. Furthermore, these types of screens not only require extra layers of cloth to compensate for inherent cloth deficiencies, but each layer requires greater lengths of cloth due to the corrugation, further increasing costs. Thus, the benefits of corrugation to the throughput, anti-clogging and life characteristics are mitigated by both old and new problems.

It is, therefore, an object of this invention to provide a screen for a vibrating screen machine having longer life than presently known screens. Another object of this invention is to provide a screen for a vibrating screen machine having improved throughput over presently known screens. It is also an object of this invention to provide a screen for a vibrating screen machine having greater resistance to fracture or tearing than presently known screens. Still another object of this invention is to provide a screen for a vibrating screen machine using fewer filter cloths than presently known screens having similar throughput and life characteristics. It is a further object of this invention to provide a screen for a vibrating screen machine which is less expensive over its life span than presently known screens. And it is an object of this invention to provide a screen for a vibrating screen machine having greater resistance to fracture or tearing when corrugated than presently known corrugated screens.

SUMMARY OF THE INVENTION

In accordance with the invention, a screen is provided for use with a vibrating screening machine to filter undesired particles from a liquid. A filter cloth having a substantially rectangular mesh suitable for separating the undesired particles from the liquid is bonded in laminar relationship to a back-up having a substantially coarser mesh, preferably by applying a coat of epoxy to the back-up and fusing the filter cloth to the back-up in a heat press. The substantially rectangular mesh is formed by a lengthwise array of parallel individual wires woven with a transverse widthwise array of parallel groups of at least three wires. The individual wires are distorted from rectangular proximate the ends of the rectangles by bows in the individual wires at their area of intersection with each of the parallel groups of wires. This configuration provides improved throughput and life characteristics over known screens.

To further enhance the life of the screen with minimal impact on throughput, a plastic grid of mesh substantially greater than the back-up mesh is fused to the bonded lamination of the filter cloth and the back-up. The grid further reduces the possibility of separation between parallel individual wires which would shorten the life of the screen.

Finally, to further increase throughput, the fused grid, cloth and back-up are corrugated in approximately triangular or sinusoidal fashion with the apexes and nadirs of corrugation being parallel to the groups of wires. By using distorted rectangular mesh filter cloth, the possibility of fracture and tearing at the apexes and nadirs of corrugation and the midpoint bubbling experienced with known corrugated screens is reduced. Thus, the use of corrugated screen with a filter cloth of distorted rectangular mesh increases both screen life and throughput.

The screen, in any of its embodiments, can also be secured to a perforated plate or to a plurality of metal strips if additional strength is desired. In the corrugated embodiment, the plate or strips are bonded to the nadirs of the corrugated screen.

Preferably, the back-up is a calendared 8 mesh mill grade cloth and the plastic grid has 1×1" or 2×2" openings, but the particular back-up and grid configuration will be determined by the screen application. In the corrugated embodiment, it is preferred to align the grid openings diagonally in the screen.

BRIEF DESCRIPTION OF THE DRAWINGS

Other objects and advantages of the invention will become apparent upon reading the following detailed description and upon reference to the drawings in which:

FIG. 4 is a sectional view of a gridded embodiment of a screen using a distorted rectangular filter cloth;

FIG. 5 is a sectional view of a corrugated embodiment of a screen using a distorted rectangular filter cloth; and FIG. 6 is a sectional view of a perforated plate embodiment of a screen using a distorted rectangular filter cloth.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
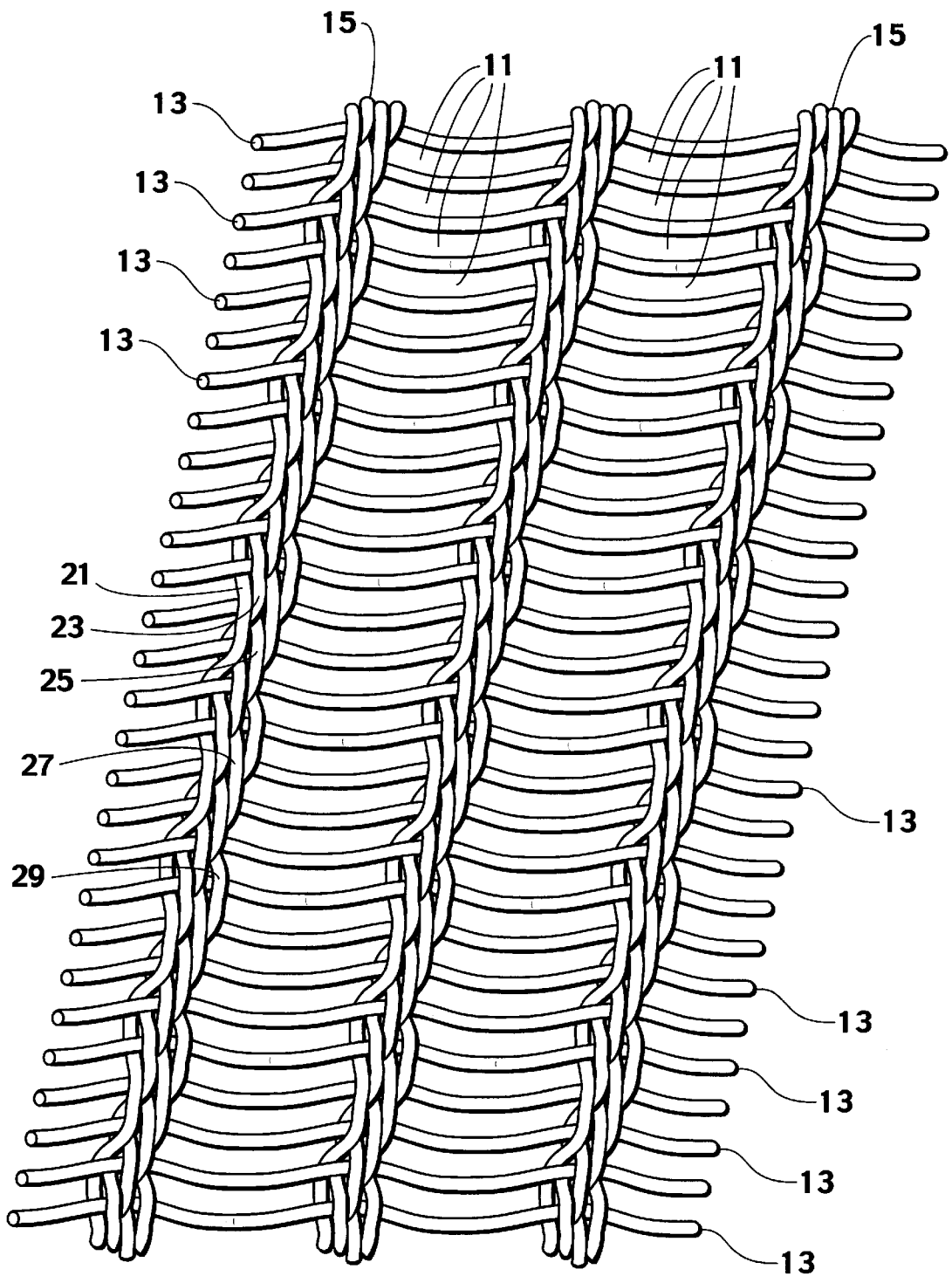
FIG. 1 is a perspective view of a segment of one embodiment of a distorted rectangular filter cloth for use in a vibrating screen.

Turning first to FIG. 1, a segment of distorted rectangular filter cloth is illustrated in which substantially rectangular openings 11 are defined by a weave of parallel individual wires 13 along the lengths of the rectangular openings 11 with transverse parallel groups 15 of five wires along the widths of the rectangular openings 11. As shown, the wires 21, 23, 25, 27 and 29 in each group 15 are alternated over and under pairs of individual wires 13, the beginning of the weave for the first group wire 21 starting at one of the individual wires 13 and each successive group wire 23, 25, 27 and 29 starting at the next successive individual wire 13. However, the number of wires in the groups 15 can be three or more and the weave configuration can be any taught in U.S. Pat. Nos. 5,256,291, 5,256,292 and 5,370,797. It is important, however, that in weaving the cloth, the tension forces in the weaving process cause the individual wires 13 to be distorted out of rectangular proximate the lengthwise ends of the rectangular openings 11.

Figure 2:
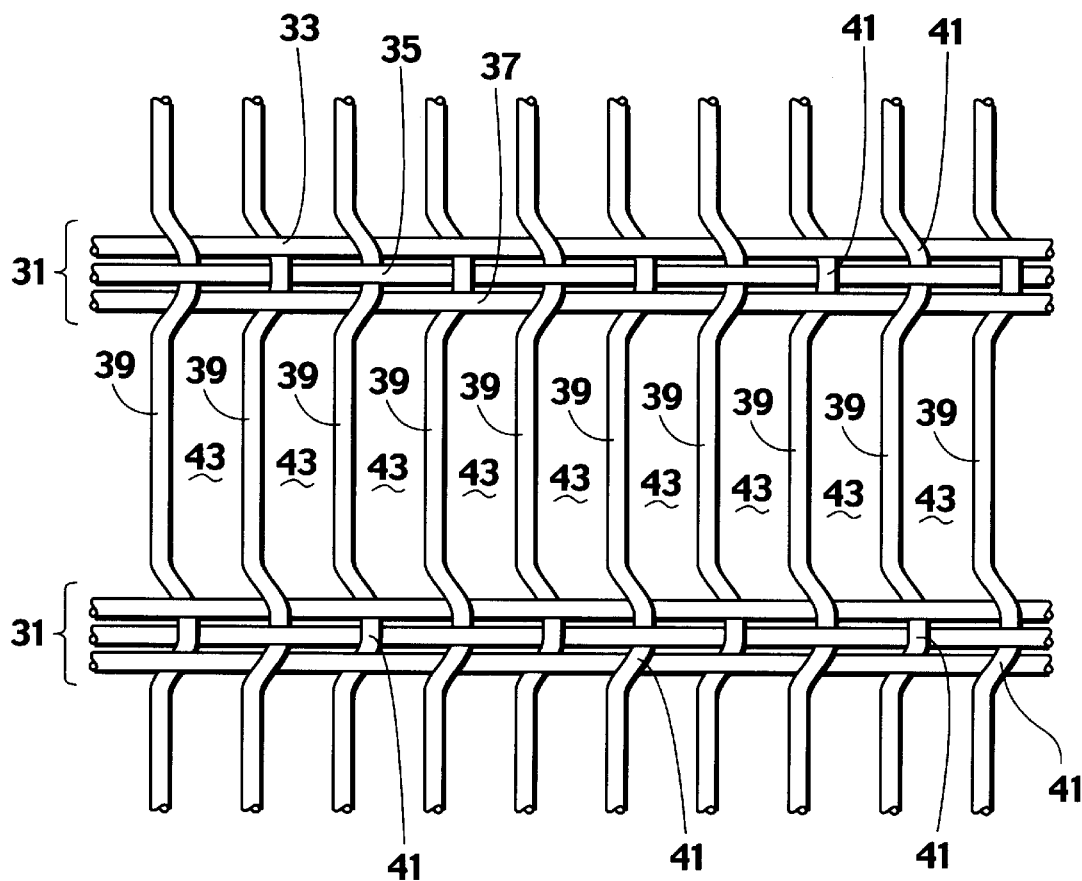
FIG. 2 is a top plan view of a segment of a preferred embodiment of the distorted rectangular filter cloth at approximately 140 magnification.

The distorted rectangular relationship can best be understood in relation to FIG. 2 illustrating an approximately 140 magnification of a segment of a preferred embodiment of the distorted rectangular filter cloth in which groups 31 include three wires 33, 35 and 37 interwoven with individual wires 39. In the weaving process, as the individual wires 39 are sequentially drawn under tension between the group wires 33, 35 and 37, the group wires 33, 35 and 37 force the individual wires 39 into bows 41 which extend through each of the groups 31. As sequential individual wires 39 are woven into the cloth, the groups 31 lock the bows 41, resulting in the distorted rectangular openings 43 in the cloth. It is believed that this distortion of the rectangular openings affords a small amount of uniform stretch in the cloth which reduces the damaging forces applied to the cloth during use.

Figure 3:
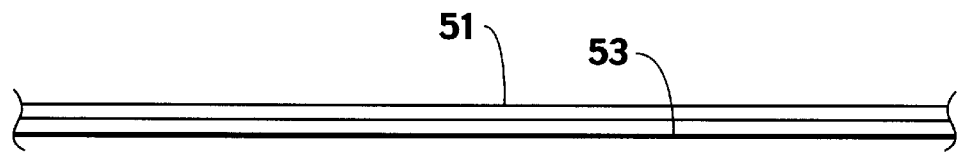
FIG. 3 is a sectional view of a back-up embodiment of a screen using a distorted rectangular filter cloth.

As shown in FIG. 3, in one embodiment of the screen the distorted rectangular filter cloth 51 is bonded to a back-up 53. The back-up 53 is typically a square mesh cloth of mesh having coarser or substantially larger openings than the filter cloth and, preferably and by way of example, is an 8-mesh mill grade cloth. The filter cloth 51 can be bonded to the back-up 53 by application of an epoxy coat to the back-up 53 and fusion of the filter cloth 51 and the back-up 53 in a heat press. Such bonding processes and others are well known in the industry. This bonding of the distorted rectangular filter cloth 51 to the back-up 53 inhibits separation of the individual wires and therefore increases the life of the screen.

Looking at FIG. 4, the bonded distorted rectangular filter cloth 51 and back-up 53 are fused with a plastic grid 55 of mesh substantially coarser than the mesh of the back-up 53 to provide another embodiment of the screen having even greater life. The grid will typically be of 1×1" or 2×2" openings, though other openings can be used depending on the particular screen application. The process for fusing a filter cloth and a back-up with the grid is known in the industry and explained in U.S. Pat. No. 5,417,793 and 5,417,859.

The screen of FIG. 4 is specially suited for approximately triangular or sinusoidal corrugation as is illustrated in FIG. 5. In the embodiment of FIG. 5, the screen of FIG. 4 is corrugated so that the apexes 61 and nadirs 63 of corrugation extend in a direction parallel to the groups of wires in the distorted rectangular filter cloth as was explained in relation to FIGS. 1 and 2. In this embodiment, the throughput benefits of corrugation are gained without significant diminishing of the screen life benefits gained by grid embodiment of FIG. 4.

As shown in FIG. 6, the screen of FIG. 5 is bonded to a perforated plate 65 to further increase its strength and life. In this embodiment, the nadirs 63 of the corrugated screen are bonded to the plate 65 in any manner known in the industry, such as described in U.S. Pat. No. 5,417,858. Alternatively, strips of metal bonded transversely to the nadirs 63 of the corrugated screen may be used in lieu of the plate 65. The screen embodiments of FIGS. 3 and 4 can also be bonded to a plate or metal strips.

It may be desirable to use a calendared back-up in any of the embodiments. Frames for the various embodiments and the attachment of connectors such as hook strips to the screen or frame are well known in the art.

Thus, it is apparent that there has been provided, in accordance with the invention, a distorted rectangular filter cloth screen for vibrating screening machines that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A screen for use with a vibrating screening machine to filter undesired particles from a liquid comprising:
    a filter cloth having a substantially rectangular mesh suitable for separating the undesired particles from the liquid;
    a back-up having a mesh substantially coarser than said filter cloth mesh; and
    means for bonding said filter cloth and said back-up in laminar relationship;
    said substantially rectangular mesh comprising an array of parallel individual wires as lengths thereof and a transverse array of parallel groups of at least three wires as widths thereof, said individual wires of said substantially rectangular mesh when viewed in a direction perpendicular to a surface of said cloth being distorted from rectangular proximate ends of said lengths by bows in said individual wires extending through each of said parallel groups of wires.

2. A screen according to claim 1, said bonding means comprising a coat of epoxy applied to said back-up, said filter cloth being bonded to said back-up by fusion in a heat press.

3. A screen according to claim 1, said back-up being calendared.

4. A screen according to claim 1, said bonded cloth and back-up being bonded to a perforated plate.

5. A screen for use with a vibrating screening machine to filter undesired particles from a liquid comprising:
    a filter cloth having a substantially rectangular mesh suitable for separating the undesired particles from the liquid;
    a back-up having a mesh substantially coarser than said filter cloth mesh;
    means for bonding said filter cloth and said back-up in laminar relationship; and
    a plastic grid of mesh substantially greater than said back-up mesh fused to a bonded lamination of said filter cloth and said back-up;
    said substantially rectangular mesh comprising an array of parallel individual wires as lengths thereof and a transverse array of parallel groups of at least three wires as widths thereof, said individual wires of said substantially rectangular mesh when viewed in a direction perpendicular to a surface of said cloth being distorted from rectangular proximate ends of said lengths by bows in said individual wires extending through each of said parallel groups of wires.

6. A screen according to claim 5, said bonding means comprising a coat of epoxy applied to said back-up, said filter cloth being bonded to said back-up by fusion in a heat press.

7. A screen according to claim 5, said back-up being calendared.

8. A screen according to claim 5, said fused cloth, back-up and grid being bonded to a perforated plate.

9. A screen for use with a vibrating screening machine to filter undesired particles from a liquid comprising:
    a filter cloth having a substantially rectangular mesh suitable for separating the undesired particles from the liquid;
    a back-up having a mesh substantially coarser than said filter cloth mesh;
    means for bonding said filter cloth and said back-up in laminar relationship; and
    a plastic grid of mesh substantially greater than said back-up mesh fused to a bonded lamination of said filter cloth and said back-up;
    said substantially rectangular mesh comprising an array of parallel individual wires as lengths thereof and a transverse array of parallel groups of at least three wires as widths thereof, said individual wires of said substantially rectangular mesh when viewed in a direction perpendicular to a surface of said cloth being distorted from rectangular proximate ends of said lengths by bows in said individual wires extending through each of said parallel groups of wires and said fused grid, cloth and back-up being corrugated with apexes and nadirs of corrugation being parallel to said groups of wires.

10. A screen according to claim 9, said bonding means comprising a coat of epoxy applied to said back-up, said filter cloth being bonded to said back-up by fusion in a heat press.

11. A screen according to claim 9, said back-up being calendared.

12. A screen according to claim 9, said corrugated grid, cloth and back-up being bonded to a perforated plate along said nadirs.

13. A screen for use with a vibrating screening machine to filter undesired particles from a liquid comprising:
    a filter cloth having a substantially rectangular mesh suitable for separating the undesired particles from the liquid;
    a back-up having a mesh substantially coarser than said filter cloth mesh;
    means for bonding said filter cloth and said back-up in laminar relationship;
    a plastic grid of mesh substantially greater than said back-up mesh fused to a bonded lamination of said filter cloth and said back-up;
    said substantially rectangular mesh comprising an array of parallel individual wires as lengths thereof and a transverse array of parallel groups of at least three wires as widths thereof, said individual wires of said substantially rectangular mesh when viewed in a direction perpendicular to a surface of said cloth being distorted from rectangular proximate ends of said lengths by bows in said individual wires extending through each of said parallel groups of wires, said fused grid, cloth and back-up being corrugated with apexes and nadirs of corrugation being parallel to said groups of wires; and a perforated plate, said corrugated grid, cloth and back-up being bonded to said plate along said nadirs of corrugation.

14. A screen according to claim 13, said bonding means comprising a coat of epoxy applied to said back-up, said filter cloth being bonded to said back-up by fusion in a heat press.

15. A screen according to claim 13, said back-up being calendared.

16. A screen for use with a vibrating screening machine to filter undesired particles from a liquid comprising:

a filter cloth having a substantially rectangular mesh suitable for separating the undesired particles from the liquid;

a back-up having a mesh substantially coarser than said filter cloth mesh;

means for bonding said filter cloth and said back-up in laminar relationship;

a plastic grid of mesh substantially greater than said back-up mesh fused to a bonded lamination of said filter cloth and said back-up;

said substantially rectangular mesh comprising an array of parallel individual wires as lengths thereof and a transverse array of parallel groups of at least three wires as widths thereof, said individual wires of said substantially rectangular mesh when viewed in a direction perpendicular to a surface of said cloth being distorted from rectangular proximate ends of said lengths by bows in said individual wires extending through each of said parallel groups of wires, said fused grid, cloth and back-up being corrugated with apexes and nadirs of corrugation being parallel to said groups of wires; and a plurality of metal strips aligned transversely and bonded to said nadirs.

17. A screen according to claim 16, said bonding means comprising a coat of epoxy applied to said back-up, said filter cloth being bonded to said back-up by fusion in a heat press.

18. A screen according to claim 16, said back-up being calendared.

* * * * *